June 15, 1937.  J. T. OWEN  2,084,046
ELECTROLYTE AND DEVICE EMPLOYING THE SAME
Filed Jan. 20, 1932
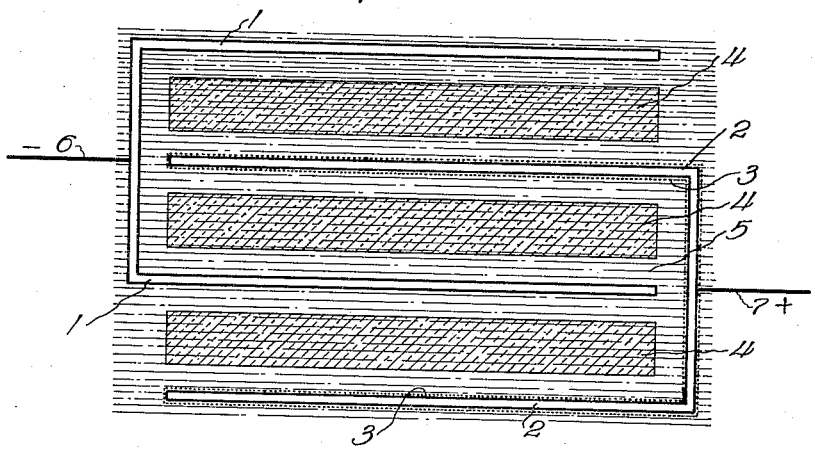
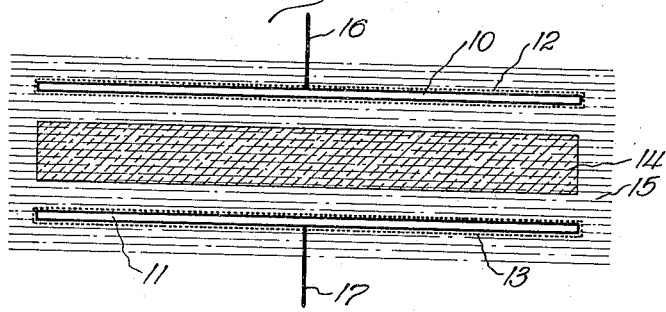
Inventors:
John T. Owen Patented June 15, 1937

2,084,046

UNITED STATES PATENT OFFICE 2,084,046

ELECTROLYTE AND DEVICE EMPLOYING THE SAME

John T. Owen, Chicago, Ill., assignor, by mesne assignments, to Tung-Sol Lamp Works Inc., Newark, N. J., a corporation of New York Application January 20, 1932, Serial No. 587,678

26 Claims. (Cl. 175—315)

This invention relates to electrolytic compounds for condensers, lightning arresters, protectors and similar devices, and to such devices containing such compounds.

It is old in the art to form condensers by placing a film of oxide upon a sheet of metal, usually aluminum, and immersing the metal in a bath of electrolyte. Certain of these prior art devices employ a liquid electrolyte to form what is known as a wet electrolytic condenser, and others provide a gel electrolyte to form what is known as a dry electrolytic condenser. The improved electrolyte of my invention may be employed in both wet and dry electrolytic condensers.

Heretofore electrolytic condensers have been suitable for use only on relatively low voltages, because of the relatively low peak voltages that the oxidized films were capable of withstanding when in contact with the electrolyte. The electrolytes employed have inherently had a relatively low conductivity which heretofore has been improved somewhat at the expense of increased power factor loss in the condenser.

In a perfect condenser the current leads the voltage by 90 degrees and is entirely wattless, that is, there is no component of the current in phase with the voltage. Theoretical condensers of this type are, of course, impossible of realization, and because of dielectric losses in the condenser the current does not lead the voltage by 90 degrees but rather lags several degrees behind this theoretical value. This results in a component of the current in phase with the voltage and a consequent power loss in the condenser. In electrolytic condensers of the prior art, when the electrolyte is treated to increase its conductivity in the direction of a lower pH value and consequently to increase the maximum peak voltage upon which the condenser can satisfactorily operate, there has been a corresponding increase in power loss in the condenser occasioned by further lagging of the current behind the theoretical 90 degrees maximum.

My improved electrolyte permits operating the condenser upon higher peak voltages than have been possible heretofore, and at the same time permits operation at this voltage without material increase in the power loss in the condenser. That is, with my improved compound I am able to increase the peak voltage of the condenser without incurring a consequent increase in power factor and loss. The phase angle of condensers employing my improved electrolyte has been found to be within not over 6° of the theoretical maximum.

Dry electrolytes of the prior art of which I am aware are incapable of forming an oxide film upon the metallic plate of the condenser. In the manufacture of these condensers the films are formed in a separate bath prior to coming into contact with the electrolyte of the condenser. As a result if the oxide film on the plate contains a small imperfection, such as a pin hole, and that imperfection breaks down during the operation of the condenser, the hole or fault increases until the condenser actually becomes short circuited and worthless. With my improved electrolyte, employed in contact with a film of oxide formed as heretofore, should an imperfection occur in the film and the metal of the plate thereby be exposed to the electrolyte, a new film of oxide will be formed by the electrolytic action of the electrolyte upon the plate when the condenser is in use, and the imperfection will be reduced rather than increased in severity. My improved electrolyte is capable of forming a suitable coating of oxide upon a metallic plate, should an occasion arise in which it would be advantageous to form the oxide film in this manner. Condensers built with my improved electrolyte have a long shelf life, that is, they may be stored in disuse for a long period of time without the electrolyte destroying any film present on one electrode or forming a film on the other electrode, and without deterioration of the electrolyte.

In the drawing:

Figure 1 illustrates my invention adapted to a condenser for use in direct or intermittent alternating current circuits; and Figure 2 illustrates my invention applied to a condenser for use in direct or intermittent alternating current circuits.

In its preferred form my invention provides an electrolyte compounded from hydroxy-alkyl amines such as a monoethanol amine indicated by the formula.

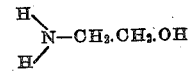

or by di ethanol amine indicated by

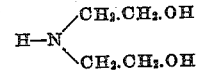

or by tri ethanol amine indicated by

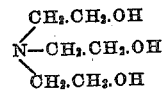

or varying mixtures of two or more of these combined with an acid in the same manner as any hydroxide such as ammonium hydroxide, sodium hydroxide, potassium hydroxide, etc., combines with acids. Although the amines have been above designated by trivalent nitrogen, it is to be understood that they are analogous to ammonia as a gas indicated as $NH_3$, and in solution as $NH_4OH$. In the latter form the nitrogen appears pentavalent. The combination of a tri ethanol amine with an acid is as follows:

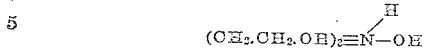

+ an acid = a salt producing a tri ethanol amine salt.

The combination of a tri ethanol amine with a fatty acid or saponifiable oil such as oleic acid, stearic acid, palmitic acids, linoleic acid, ricinoleic acid, acrylic acid, etc., is as follows:

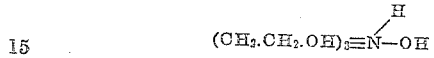

+ a fatty acid = a soap, producing a tri ethanol amine soap. It is of course to be understood that the mono- and the di-hydroxy alkyl amines react in the same way as above indicated for tri-ethanol amine.

The electrolytic salts of the hydroxy alkyl amines are active ingredients of the electrolyte. The pH value of any salt of this character is determined largely by the character of the acid component of the salt. Electrolytic acids such as boric, tartaric, malic, citric, acetic and the like give a low pH value. The hydroxyl alkyl amine salts of such acids are gels in structure. Other acids, such as the fatty acids above referred to, also have a low pH value, and their hydroxy alkyl amine salts are also gels in structure. The hydroxy alkyl amines are alkaline in character and have a pH value higher than the acids above named.

In the present invention I form salts of either the electrolytic type of acids or of the fatty type and the electrolytic type. I may in some instances have an excess of the hydroxy alkyl amine present in a free form to give a high pH value to the mixture, or I may have an excess of either type or both types of acid present to give a lower pH value to the mixture. The fatty acid salts of the hydroxy alkyl amines are not necessary for the electrolytic functioning of the conductive salts, but they are of such a physical character as gels, and are substantially harmless, so that they may be advantageously used as diluents or carriers for the electrolytic salts or the free electrolytic acids, or of the hydroxy alkyl amine, where that may be present. Electrolyte mixtures may be so made to have a pH value below 7, and are gel-like in form. Such mixtures are also hygroscopic. They may take on more than their own weight in water and will hold such water against drying out by ordinary exposure. The holding of such water, however, does not alter the desirable gel form of the electrolyte. The forms having small amounts of water resemble ordinary soap in their property of resisting low and freezing temperatures without change. Temperatures as low as −50° F. may be reached without damage. The electrolyte is highly conductive and will withstand high peak voltages.

The electrolyte of my invention may also be made by first combining approximately equal molecular weights of a mono, di or tri ethanol amine or a mixture of two or more of these and a fatty acid or saponifiable substance to produce a resultant salt. To this I add boric acid which will bring the pH value below 7 to form the electrolyte. As before, the resulting product is a gel capable of withstanding high working voltages with low power factor losses. If used as a gel electrolyte in a so-called dry electrolytic condenser, little or no water is added, and if it is to be used in a liquid electrolytic condenser sufficient distilled water is added to bring the substance to the proper viscosity as a colloidal solution, distinguishable from a colloidal gel. In either event since any of the hydroxy alkyl amine salts have an extremely high hygroscopicity, they will maintain their original moisture content throughout the life of the device in which the compound is used. As a specific example of the invention a highly satisfactory electrolyte may comprise:

| | Percent |
|---|---|
| Boric acid | 40 |
| Mono ethanol amine | 10 |
| Oleic acid | 10–20 |
| Water | 40–30 |

The above composition is sufficiently liquid in character for use in a wet electrolytic condenser. By using the same proportion of ingredients and omitting the added water the composition is a gel useful for dry electrolytic condensers. Varying the amount of water is one way of regulating the character of the product physically as to form.

The composition may also be made by the following example formulas:

Formula 1

| | Percent |
|---|---|
| Hydroxy alkyl amine | 25 |
| Boric acid | 25 |
| Fatty acid | 20 |
| Water | 30 |

The above composition is a plastic gel capable of dilution with more water.

Formula 2

| | Percent |
|---|---|
| Mono-hydroxy ethanol amine | 25 |
| Tartaric acid | 20 |
| Palmitic acid | 30 |
| Water | 25 |

The above product is a plastic gel capable of dilution with more water.

Formula 3

| | Percent |
|---|---|
| Tri hydroxy ethanol amine | 35 |
| Malic acid | 10 |
| Stearic acid | 25 |
| Water | 30 |

This compounds is also a plastic gel capable of dilution with more water.

Formula 4

| | Percent |
|---|---|
| Di hydroxy ethanol amine | 30 |
| Boric acid | 30 |
| Water | 40 |

This forms a plastic mass capable of dilution with more water and susceptible to the addition of fatty acid.

Formula 5

| | Percent |
|---|---|
| A hydroxy butanol amine | 35 |
| Boric acid | 10 |
| Stearic acid | 25 |
| Water | 30 |

More or less water may be employed to control the liquid or gel character as desired.

In making these compounds the electrolytic acid and the hydroxy alkyl amine are mixed. The electrolytic acids are crystalline in structure, and they may contain water of crystallization. The hydroxy alkyl amines are generally syrupy liquids miscible with water, and the commercial forms usually contain some water. They may be used in anhydrous form. Upon mixing an exothermic reaction results forming the gel or a solution of the gel. The fatty acid may be added to the resulting mixture either hot or cold. All or part of the fatty acid unites with any excess of the hydroxy alkyl amine and when an excess is used it assures that no alkaline condition results. For the preferred use of the invention, as in condenser electrolytes, sufficient acid, of one kind or another, must be added to prevent the presence of uncombined hydroxy alkyl amine. The amount of water concerned in the reaction is immaterial except as a control of the physical character of the product.

The resulting electrolyte formed by combining hydroxy alkyl amine with a suitable acid such as boric acid is non-corrosive in the absence of current. When used as above described in a condenser with current, it is advantageously capable of forming the positive plate of an electrolytic condenser from pure metal, such as aluminum, for example, and for this reason there is no tendency for the electrolyte to disintegrate the oxidized film on that plate however it be formed. The particular proportions of hydroxy alkyl amines and acids employed in the manufacture of my improved electrolyte may be varied over a considerable range without materially altering the characteristics of the electrolyte. This fact renders the electrolyte particularly advantageous for commercial use since it can be successfully manufactured by relatively inexperienced workmen with a uniformly high quality of the product resulting. The cost of manufacturing the electrolyte is very low.

Condensers employing hydroxy alkyl amine salt as an electrolyte show a resistance value of as high as 650 megohms per microfarad, a phase angle of within 6 degrees of the theoretical maximum and a safe peak voltage of 550 volts. By using this electrolyte in a condenser having two oxide film formed plates, a device is formed which can be used advantageously for power factor correction on low voltage A. C. currents, such as 110 volts. Condensers with single formed anodic films, and condensers with two formed plates have a multiplicity of uses well known to the art and the present electrolyte may be advantageously used in such condensers. The cost of such condensers is relatively low as a result of the relatively low cost of the electrolyte.

The electrolyte as a gel, may be used between the two plates of a condenser when those plates are planar surfaces or when they are formed as a series of convolutions. In Figure 1 I have diagrammatically illustrated such construction, applied to a condenser designed for direct current work. In this condenser the negative plate 1, or plates 1, comprises base metal, preferably aluminum. No oxide film is formed on this plate. The positive plate 2 is suitably treated to coat it with an oxide film indicated at 3. Separators 4 may be inserted between the plates 1 and 2 to provide mechanical separation, this being particularly advantageous in case the plates are formed convolute. Preferably the separators are formed of a foraminous, or porous, or absorptive substance, such as cloth or paper. The electrolytic gel 5 saturates these separators 4 and fills the voids between the plates and in fact surrounds the plates. The condenser thus formed is encased in a suitable housing, not shown, and the plates are rendered accessible by lead out wires 6 and 7 which extend out of the casing. The condenser shown has high capacitance per unit volume.

The electrolyte as a gel may be used to form an electrolytic condenser for use in alternating current circuits. Such a construction is diagrammatically illustrated in Figure 2 of the drawing. This condenser comprises plates 10 and 11, containing films 12 and 13 respectively. The plates may conveniently be aluminum and the films aluminum oxide. A foraminous separator 14 may be used to mechanically separate the plates. This separator is saturated with the electrolyte 15 which fills the voids between the plates and surrounds them. The condenser is housed in a suitable casing, not shown, from which lead out wires 16 and 17 extend to connect the plates 10 and 11 to the external circuit. Such a condenser has high capacitance per unit volume, high resistance and can be successfully operated on high peak voltages. The films are not deteriorated by the electrolyte when the condenser is disconnected from current for long periods of time. When current flows through the condenser, the films are built up rather than destroyed.

While my improved electrolytic compound is intended primarily for use as an electrolyte in an electrolytic condenser, it may also be used as an electrolyte in an electrolytic lightning arrester or protecting device, and for many other purposes. I am not, therefore, to be limited to the specific use of the compound herein described by way of example.

What I consider new and desire to have protected by Letters Patent is pointed out in the appended claims.

What I claim is:

1. An electrical device comprising a film-forming metal electrode in contact with an electrolyte comprising as the essential ingredient salt of hydroxy alkyl amine and weak electrolytic acid.

2. An electrical device comprising a film-forming metal electrode in contact with a liquid electrolyte comprising in solution as the essential ingredient salt of hydroxy alkyl amine and weak electrolytic acid.

3. An electrical device comprising a film-forming metal electrode in contact with a gel electrolyte comprising as the essential ingredient colloidal gel of salt of hydroxy alkyl amine and weak electrolytic acid.

4. An electrical device comprising a film-forming metal electrode in contact with an electrolyte comprising the reaction products of a mixture of fatty acid, weak electrolytic acid, and hydroxy alkyl amine.

5. An electrical device comprising a film-forming metal electrode in contact with an electrolyte comprising the reaction products of a quantity of hydroxy alkyl amine completely neutralized with added weak electrolytic acid.

6. An electrical device comprising a film-forming metal electrode in contact with an electrolyte comprising the reaction products of a quantity of hydroxy alkyl amine completely neutralized with added weak electrolytic acid and fatty acid.

7. An electrical device comprising a film-forming metal electrode in contact with an electrolyte comprising a mixture of salts of hydroxy alkyl amine and weak electrolytic acid and of hydroxy alkyl amine and fatty acid.

8. An electrical device comprising a film-forming metal electrode in contact with an electrolyte containing essentially electrolytic salt of hydroxy alkyl amine and weak electrolytic acid, and containing one material for controlling the pH value selected from the group consisting of fatty acid, weak electrolytic acid, and hydroxy alkyl amine.

9. An electrical device comprising a film-forming metal electrode in contact with an electrolyte containing essentially electrolytic salt of hydroxy alkyl amine and weak electrolytic acid, and containing acid material in excess for controlling the pH value selected from the group consisting of fatty acid, and electrolytic acid.

10. An electrical device comprising a film-forming metal electrode in contact with an electrolyte containing essentially electrolytic salt of hydroxy alkyl amine, and containing salt of hydroxy alkyl amine and acid selected from the group consisting of oleic, stearic, palmitic, linoleic, ricinoleic, and acrylic.

11. An electrical device comprising a film-forming metal electrode in contact with an electrolyte containing essentially a salt of a weak electrolytic acid and of hydroxy alkyl amine.

12. An electrical device comprising a film-forming metal electrode in contact with a gel electrolyte characterized by hygroscopicity and containing salt of hydroxy alkyl amine and weak electrolytic acid.

13. An electrical device comprising a film-forming metal electrode in contact with an electrolyte characterized by a pH not over 7, and containing essentially salt of hydroxy alkyl amine and weak electrolytic acid.

14. An electrical device comprising an oxide-film-carrying electrode in contact with an electrolyte containing essentially electrolytic salt of hydroxy alkyl amine.

15. An electrical device comprising one electrode, and a second oxidizable-metal electrode capable of forming an oxide-film of the electrically useful oxide-film type, and an electrolyte between said electrodes containing essentially electrolytic salt of hydroxy alkyl amine.

16. An electrolyte for electrolytic condensers comprising triethanolamine and boric acid.

17. An electrolyte for electrolytic condensers comprising triethanolamine and a weak acid.

18. An electrolyte for electrolytic condensers comprising triethanolamine and a weak inorganic acid.

19. An electrolyte for electrolytic condensers comprising an alcohol substituted amine and material containing the borate radical.

20. An electrolyte for electrolytic condensers comprising triethanolamine.

21. An electrolyte for electrolytic condensers comprising tri-ethanol amine acetate.

22. An electrolytic condenser of the class described having an armature of the film-forming type, and an electrolyte consisting of an ethanol amine soap, and a salt of a weak acid having a higher conductivity than said soap.

23. An electrolyte containing an ethanol amine soap and a salt of a weak acid having a higher conductivity than said soap.

24. An electrolyte for electrolytic condensers consisting substantially entirely of triethanolamine acetate.

25. An electrolyte for electrolytic condensers comprising triethanolamine and acetic acid.

26. An electrolytic condenser of the class described having an armature of the film-forming type, and an electrolyte consisting of a triethanol amine salt.

JOHN T. OWEN.